(12) United States Patent
Martin et al.

(10) Patent No.: US 8,931,508 B2
(45) Date of Patent: Jan. 13, 2015

(54) PILOTED FUEL TANK VAPOR ISOLATION VALVE

(75) Inventors: Charles J. Martin, Dexter, MI (US); Matthew L. Erdmann, Ypsilanti, MI (US); James P. Ostrosky, Brighton, MI (US)

(73) Assignee: Eaton Corporation, Cleveland, OH (US)

( * ) Notice: Subject to any disclaimer, the term of this patent is extended or adjusted under 35 U.S.C. 154(b) by 543 days.

(21) Appl. No.: 12/542,207

(22) Filed: Aug. 17, 2009

(65) Prior Publication Data

US 2010/0051116 A1 Mar. 4, 2010

Related U.S. Application Data

(60) Provisional application No. 61/091,795, filed on Aug. 26, 2008.

(51) Int. Cl.
*B60K 15/035* (2006.01)
*F02M 25/08* (2006.01)
*F16K 31/126* (2006.01)
(Continued)

(52) U.S. Cl.
CPC ........ *F02M 25/0836* (2013.01); *F16K 31/1264* (2013.01); *F16K 31/128* (2013.01); *F16K 31/385* (2013.01); *F16K 31/402* (2013.01); *B60K 2015/03576* (2013.01);
(Continued)

(58) Field of Classification Search
CPC ............... B60K 15/03519; B60K 2015/03217; B60K 2015/03576; F16K 24/04

USPC ........ 137/487.5, 489, 491, 492, 492.5, 512.1, 137/512.15, 599.01, 599.05, 599.09, 137/599.11, 601.13, 601.14, 601.2; 251/30.01, 30.02; 123/511, 516, 518
See application file for complete search history.

(56) References Cited

U.S. PATENT DOCUMENTS 2,576,516 A * 11/1951 Jurs ............................... 137/491
3,476,146 A * 11/1969 Dolter ....................... 137/601.13
(Continued)

FOREIGN PATENT DOCUMENTS

GB 2 043301 A 10/1980
JP 60-62116 S 1/1985
(Continued)

*Primary Examiner* — William McCalister
(74) *Attorney, Agent, or Firm* — Mei & Mark LLP

(57) ABSTRACT

A vapor isolation valve includes a first chamber in fluid communication with a fuel tank and a second chamber disposed with respect to the first chamber. A diaphragm is disposed between the first and second chambers, has an orifice allowing fluid communication therebetween, and is moveable between a diaphragm open position and a diaphragm closed position. A third chamber is disposed adjacent the first chamber, relative to the diaphragm, and is in fluid communication with an exit passage. The diaphragm open position allows fluid communication between the first and third chambers, and the diaphragm closed position substantially restricts fluid communication therebetween. A pilot valve is disposed between the second and third chambers and is selectively moveable between a pilot open position configured to allow fluid communication between the second and third chambers and a pilot closed position configured to block fluid communication therebetween.

19 Claims, 3 Drawing Sheets

(51) Int. Cl.
*F16K 31/128* (2006.01)
*F16K 31/385* (2006.01)
*F16K 31/40* (2006.01)
*B60K 15/03* (2006.01)

(52) U.S. Cl.
CPC .... *B60K 2015/03217* (2013.01); *B60K 15/035* (2013.01); *F02M 25/089* (2013.01)
USPC ............ 137/487.5; 137/491; 137/492.5; 137/599.09; 137/599.11; 137/601.13; 137/601.2; 123/511; 123/516

(56) References Cited

U.S. PATENT DOCUMENTS

| | | | | |
|---|---|---|---|---|
| 4,308,841 A | * | 1/1982 | Kingsley | ................. 123/520 |
| 5,143,258 A | * | 9/1992 | Mittermaier | ................. 222/73 |
| 5,230,625 A | | 7/1993 | Sutter et al. | |
| 5,497,800 A | | 3/1996 | Ohashi et al. | |
| 5,687,759 A | * | 11/1997 | Tan | ................. 137/486 |
| 5,806,553 A | * | 9/1998 | Sidwell | ................. 137/487.5 |
| 6,003,499 A | | 12/1999 | Devall et al. | |
| 6,601,617 B2 | | 8/2003 | Enge | |
| 6,957,663 B2 | * | 10/2005 | Hirota et al. | ................. 137/613 |
| 7,444,997 B2 | | 11/2008 | Hill | |
| 7,882,824 B2 | * | 2/2011 | Hill et al. | ................. 123/521 |
| 2006/0150722 A1 | | 7/2006 | Kato et al. | |
| 2008/0083457 A1 | * | 4/2008 | Konshak | ................. 137/39 |

FOREIGN PATENT DOCUMENTS

| | | |
|---|---|---|
| JP | 4-125377 H | 4/1992 |
| JP | 4-124126 H | 11/1992 |
| JP | 8 210530 | 8/1996 |
| JP | 2003049716 A | 2/2003 |
| JP | 2005-308103 | 4/2005 |
| WO | 2005059359 A1 | 6/2005 |
| WO | 2006072633 A1 | 7/2006 |
| WO | WO 2007088137 A1 * | 8/2007 |

* cited by examiner

PILOTED FUEL TANK VAPOR ISOLATION VALVE

CROSS-REFERENCE TO RELATED APPLICATIONS

This application claims the benefit of U.S. Provisional Application No. 61/091,795, filed Aug. 26, 2008, which is hereby incorporated by reference in its entirety.

TECHNICAL FIELD

This disclosure relates to isolation valves useful in, among other things, fuel tank vapor control systems.

BACKGROUND OF THE INVENTION

Fuel tank vapor and emission control systems may be used to control the flow of fuel vapors from a vehicle's fuel tank and also to control the relative pressure of the fuel tank. Vapors may be vented to a canister or other similar vapor control structure where hydrocarbon vapors are stored and which is also connected to the engine air inlet.

Fuel tanks may generate fuel vapors during various operating phases and these vapors may be directed to a canister or other component responsible for storing them, and then purging them regularly to the admission header of the engine. Periodic purging of stored vapors may be necessary during operation of the vehicle. To conduct the purge, the fuel system is operated to control flow of vapor from the storage canister to the engine air inlet, and atmospheric air is admitted to purge the canister.

SUMMARY

A vapor isolation valve for a fuel tank includes a first chamber in fluid communication with the fuel tank and a second chamber adjacent to the first chamber. A diaphragm is disposed between the first and second chambers and has a diaphragm orifice allowing fluid communication between the first and second chambers. The diaphragm is moveable between a diaphragm open position and a diaphragm closed position.

A third chamber is disposed on the same side of the diaphragm as the first chamber and is in fluid communication with an exit passage. The diaphragm open position allows fluid communication between the first chamber and the third chamber, and the diaphragm closed position substantially restricts fluid communication between the first chamber and the third chamber.

A pilot valve is disposed between the second and third chambers and is selectively moveable between a pilot open position configured to allow fluid communication between the second and third chambers and a pilot closed position configured to block fluid communication between the second and third chambers. The vapor isolation valve may be in communication with a control system, and the pilot valve configured to move between the pilot open and closed positions in response to an electronic signal from the control system.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
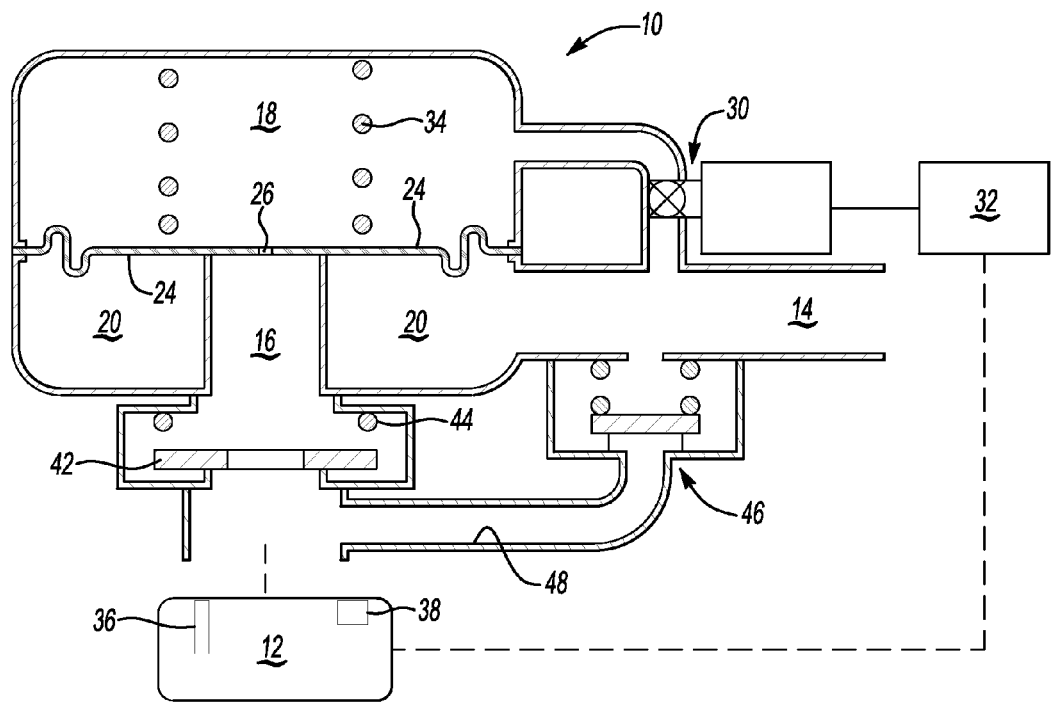
FIG. 1 is a schematic diagram of a vapor isolation valve in a steady state condition, in which there is substantially no flow or venting occurring.

Referring to the drawings, wherein like reference numbers correspond to like or similar components throughout the several figures, there is shown in FIG. 1 an embodiment of a vapor isolation valve 10. The valve 10 controls transfer of fuel vapors, air, and other fluids between a fuel tank 12 (represented schematically below the valve 10) and an exit passage 14.

The valve 10 may be located or mounted directly on the fuel tank 12 or may be mounted remotely. Additional components, such as, without limitation, additional valves (not shown) or passageways (not shown) may be interspersed between the fuel tank 12 and the valve 10. Exit passage 14 may be in communication with the vehicle's evaporative system (not shown) and may also be referred to as the vent path, as this is the path for venting or relieving excess fuel vapor from the fuel tank 12.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Valve 10 includes three main primary chambers. A first chamber 16 is in fluid communication with the fuel tank 12, either directly or via additional passageways and valves. A second chamber 18 is disposed above (as viewed in FIG. 1) the first chamber 16, and a third chamber 20 is in fluid communication with the exit passage 14.

A diaphragm 24 is disposed between the first chamber 16 and the second chamber 18, and also between the third chamber 20 and the second chamber 18. The diaphragm 24 has a diaphragm orifice 26, which allows limited fluid communication—because the diaphragm orifice 26 is relatively small—between the first chamber 16 and the second chamber 18. The diaphragm 24 is moveable between a diaphragm closed position (shown schematically in FIGS. 1, 2 and 5) and a diaphragm open position (shown schematically in FIGS. 3 and 4, and discussed in more detail herein).

The diaphragm 24 may be referred to as a membrane or membrane valve, and may be formed from a compliant material, such as, without limitation: natural rubber, synthetic rubber, silicone, or another material as would be recognized by a person having ordinary skill in the art. Diaphragm 24 may further include a steel or a plastic portion, through which the diaphragm orifice 26 may be formed, as long as the diaphragm 24 is movable between the diaphragm open position and the diaphragm closed position.

The third chamber 20 is disposed on the same side of the diaphragm 24 as the first chamber 16. Therefore, the diaphragm open position allows fluid communication between the first chamber 16 and the third chamber 20 and the diaphragm closed position substantially restricts fluid communication between the first chamber 16 and the third chamber 20.

The fuel vapors within the first chamber 16 have a first surface area or effective contact area with the diaphragm 24 and the second chamber 18 has a second area in contact with the diaphragm 24. Vapor within the third chamber 20 has a third surface area with the diaphragm 24. The second surface area is larger than the third surface area, and the third surface area is larger than the first surface area. Note, however, that the third chamber 20 need not surround the first chamber 16, as shown in FIG. 1, but may be adjacent to the first chamber 16.

The valve 10 also includes a pilot valve 30 that is disposed between the second chamber 18 and the third chamber 20. The pilot valve 30 is selectively moveable between a pilot open position (shown schematically in FIGS. 2-4 and discussed in more detail herein) and a pilot closed position (shown schematically in FIGS. 1 and 5). The pilot open position is configured to allow fluid communication between the second chamber 18 and the third chamber 20, and the pilot closed position is configured to block fluid communication between the second chamber 18 and the third chamber 20.

The valve 10 is in communication with a control system 32. As discussed in relation to the descriptions of the operating states of valve 10, the pilot valve 30 is configured to move between the pilot open position and the pilot closed position in response to an electronic signal from the control system 32. The control system 32 may be, without limitation, an engine electronic control (EEC), powertrain control module (PCM), engine control unit (ECU), or other structure suitable to control the pilot valve 30 and valve 10.

The valve 10 includes the pilot valve 30 and the opening and closing characteristics of the valve 10 are controlled or operated by the control system 32, and may, therefore, also be referred to as a Piloted Fuel Tank Vapor Isolation Valve (PVIV). The PVIV valve 10 may be used to regulate fuel vapors exiting the fuel tank 12.

Several operating conditions or states of the valve 10 are described herein, including both transitional and steady-state conditions. Those having ordinary skill in the art will recognize that the valve 10 may have additional operating conditions or configurations within the scope of the appended claims. For illustrative purposes, the pressure within the first, second, and third chambers, 16, 18, and 20, are referred to herein as P1, P2, and P3, respectively. Furthermore, under normal operating conditions, it may be assumed, for illustrative purposes, that P3 (the pressure within the third chamber 20) is approximately equivalent to atmospheric pressure.

Referring again to FIG. 1, the operating condition shown may be referred to as a normal operating condition or a run-loss condition. This condition may occur when a vehicle is being operated and conditions have generated some fuel vapor, but the control strategy is to contain that vapor. The control system 32 places the pilot valve 30 in the pilot closed position—which may be its normal or default state—and the fuel tank 12 is therefore at a positive pressure relative to the exit passage 14. Therefore, the pressure in the first chamber 16 is greater than the pressure in the third chamber 20; P1>P3.

The diaphragm orifice 26 that connects the first chamber 16 to the second chamber 18 keeps P1 and P2 at equilibrium, and both are greater than P3. Although P1 and P2 are at the same pressure, the diaphragm 24 remains in the diaphragm closed position and sealed against vapor flow between the first and third chambers 16 and 20. The diaphragm 24 seals against flow of vapor because P3 is lower than P1 and P2, so there is a net force downward (as viewed in the figures) on the diaphragm 24 due to the second chamber 18 allowing P2 to be applied over a larger area, the second surface area. There is no vapor flow in this scenario.

Figure 2:
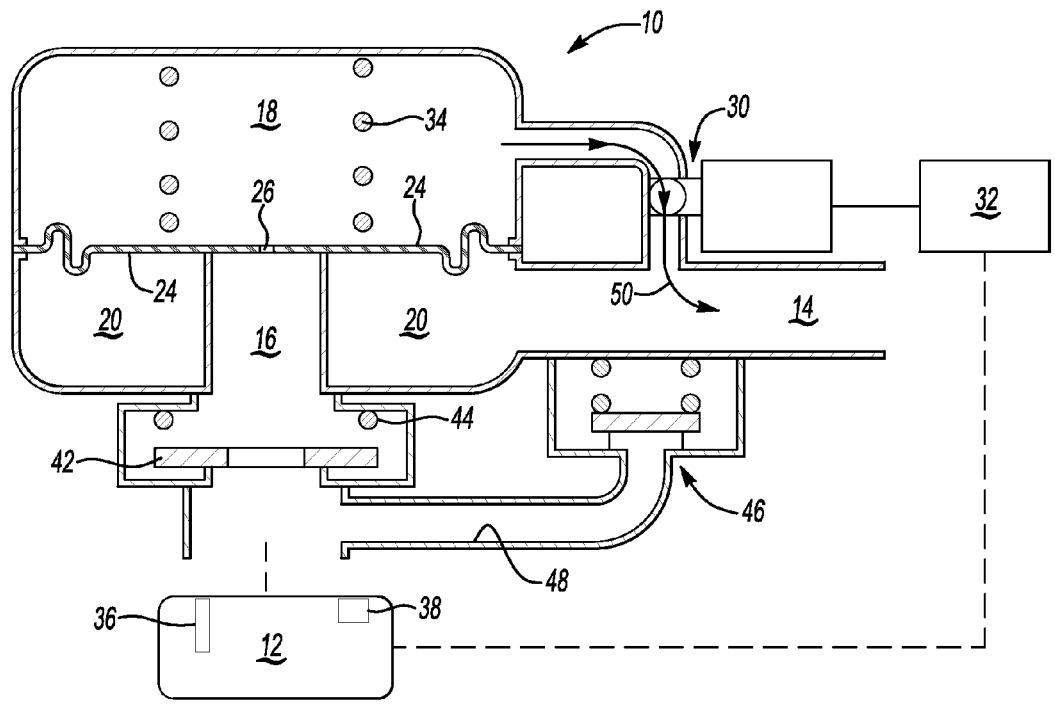
FIG. 2 is a schematic diagram of the vapor isolation valve in a low flow state, in which vapors are venting to an exit passage through a pilot valve.
Figure 3:
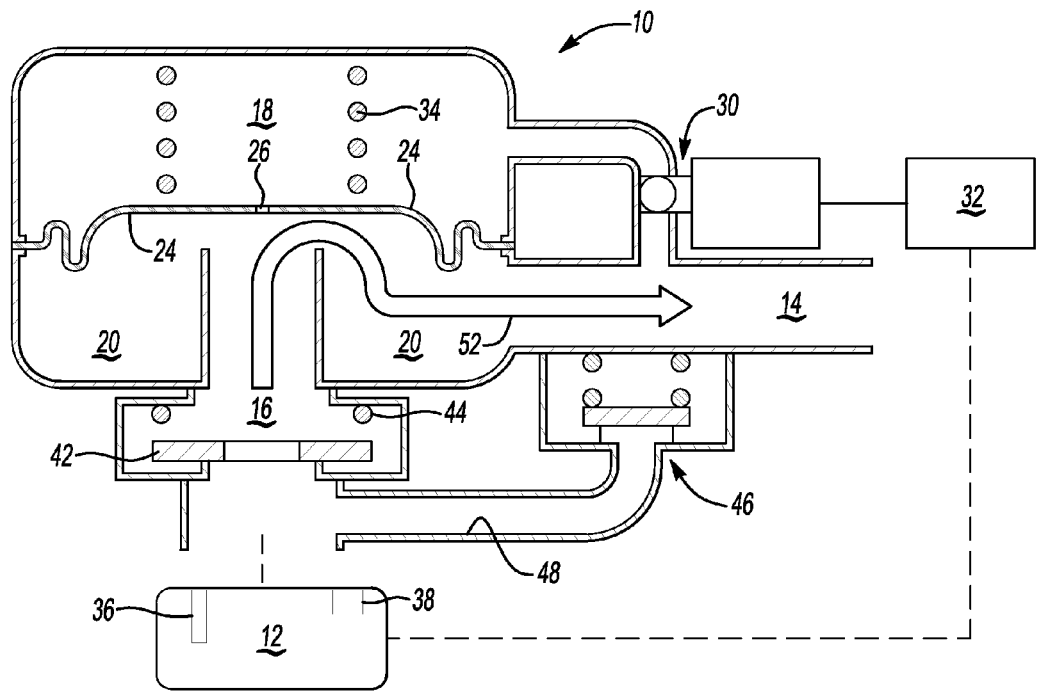
FIG. 3 is a schematic diagram of the vapor isolation valve in a high flow state, in which vapors are venting to an exit passage.

Referring now to FIGS. 2 and 3, and with continued reference to FIG. 1, the vehicle programming may determine that venting of the fuel tank 12 is desired during normal vehicle operation. The control system 32 will then instruct the pilot valve 30 to switch or move to the pilot open position by sending an electronic signal to the pilot valve 30. This state is shown in FIG. 2. P1 will initially be the same as P2—because, as described above, pressure is equalized due to the diaphragm orifice 26—and P2 is greater than P3.

The pressure differential between P2 and P3 causes vapor in the second chamber 18 to be evacuated through the pilot valve 30 into the third chamber 20 and out through the exit passage 14. Because P2 will decrease slowly, it will remain close to P1, and some pressure-equalization flow will occur through the diaphragm orifice 26. As shown in FIGS. 1 and 2, the valve 10 may further include a diaphragm spring 34, which is configured to bias the diaphragm toward the first chamber 16 and the diaphragm closed position.

The combined downward spring force (as viewed in FIGS. 1 and 2) of the diaphragm spring 34 and the diaphragm 24 itself will maintain the diaphragm 24 in the diaphragm closed position and continue to seal against flow directly between the first chamber 16 and the third chamber 20. Therefore, the through the exit passage 14 will occur at a first exit flow rate, which is a relatively low flow. This low flow rate is shown schematically in FIG. 2 as small flow arrow 50.

Once the pressure being exerted by P2 over the second surface area of the diaphragm 24 decreases to the point where P1 overcomes both P2 and the spring force, the diaphragm 24 will flex upward, moving to the diaphragm open position, as shown in FIG. 3. Allowing direct flow of vapor from the first chamber 16 to the third chamber 20, due to the diaphragm open position, results in a second exit flow rate between the fuel tank 12 and the exit passage 14. This is a relatively high flow condition, and is shown schematically in FIG. 3 as large flow arrow 52. The second exit flow rate is greater than the first exit flow rate (shown schematically by the relatively large size of large flow arrow 52 compared to the small flow arrow 50).

The high flow rate will continue until the force above the diaphragm 24 (which includes the spring force) equals the force below the diaphragm 24. At that point, the diaphragm would return to the sealed position and all pressures would be equivalent (P1=P2=P3). For the increased flow rates and control over the two-stage flow, the flow path through the pilot valve 30 may be sized much larger than the flow path through the diaphragm orifice 26.

The valve 10 therefore acts as a two-stage exit flow mechanism when venting high pressure from the fuel tank 12 to the exit passage 14. The two-stage exit flow may reduce wear on the valve 10 and the remainder of the fuel system by damping transitions between no vapor flow and high vapor flow. Furthermore, the two-stage flow may reduce the pressure differentials across other valves—such as, without limitation, fill/fuel level vapor valves (FLVV) or grade vent valves (GVV)—which are located between the fuel tank 12 and the valve 10.

Reducing the pressure differential across, for example, an FLVV reduces the likelihood that the FLVV valve will be improperly closed due to corking. "Corking" is a phenomenon where the force of the rushing fuel vapors may physically lift the valve float up against the seat, thereby blocking free vapor exit through the valve.

The diaphragm spring 34 may be combined with a metal or plastic disc slidably disposed between the first and third chambers 16, 20 and the second chamber 18. Such a configuration may replace the compliant-material based diaphragm 24 by allowing the disc to move or slide between the diaphragm open and closed positions without flexing. In such a configuration, the spring force would be generated from substantially only the diaphragm spring 34.

For refueling, pressure in the fuel tank 12 needs to be relieved before the cap is opened and the fuel-fill event begun. This is also referred to as venting the fuel tank 12 prior to refueling. The valve 10 will initially be in a steady-state, such that P1 will be equal to P2, and P3 will be at a lower pressure; as shown in FIG. 1.

When the control system 32 recognizes a fuel-fill event is about to occur, the pilot valve 30 is switched to the pilot open position and the vapor in the second chamber 18 (above the diaphragm 24) will begin to dump through the pilot valve 30 to the third chamber 20 and exit passage 14; as shown in FIG. 2. Once sufficient pressure is relieved from the second chamber 18, the diaphragm 24 will deflect to the diaphragm open position. The diaphragm open position will allow high flow from the valve 10; as shown in FIG. 3.

The fuel-fill event completes when the fuel tank 12 becomes full, e.g. when a fuel level within fuel tank 12 reaches a predetermined level. In order to monitor the fuel level, the vehicle may include an in-tank fuel sender 36 or a pressure transducer 38 (or both). The pressure transducer 38 may not directly monitor the fuel level, but determines the pressure within fuel tank 12. It is possible to tell when the fuel tank 12 is full at the end of the fuel-fill event because the pressure will spike. The in-tank fuel sender 36 and pressure transducer 38 may also be used for other purposes, such as signaling the vehicle operator of the fuel level via the gas gauge or monitoring pressure levels within the fuel tank 12.

The control system 32 is in communication with either the in-tank fuel sender 36 or the pressure transducer 38, and is configured to monitor the fuel level during fuel-fill events. As the fuel level nears or reaches the full level (or some other predetermined fuel level) the pilot valve 30 moves to the pilot closed position in response to an electronic signal indicating completion of the fuel-fill event. The electronic signal indicating completion of the fuel-fill event may be generated by either the in-tank fuel sender 36 or the pressure transducer 38 and may be sent directly to the control system 32 or filtered through other components.

Closing the pilot valve 30 will cause pressure differentials to exist within the valve 10. The pressure P2 in the second chamber 18 will become greater than the pressure P3 in the third chamber 20. Because P3 acts over the third surface area and P2 acts over a larger area of the diaphragm 24, the second surface area, the diaphragm 24 will close. Once the diaphragm 24 closes, the pressure P1 in the first chamber 16 will rise with the addition of any more fuel to the fuel tank 12 or as additional fuel vapor is created in the fuel tank 12. Increased pressure in the fuel tank 12 will cause the fuel-fill event to complete, because the fuel nozzle will automatically shut off when it senses differential pressure across its sensing orifices, as would be recognized by one having ordinary skill in the art. This fuel-fill shut-off feature may be used to accomplish a zero round-up fuel-fill event.

Figure 4:
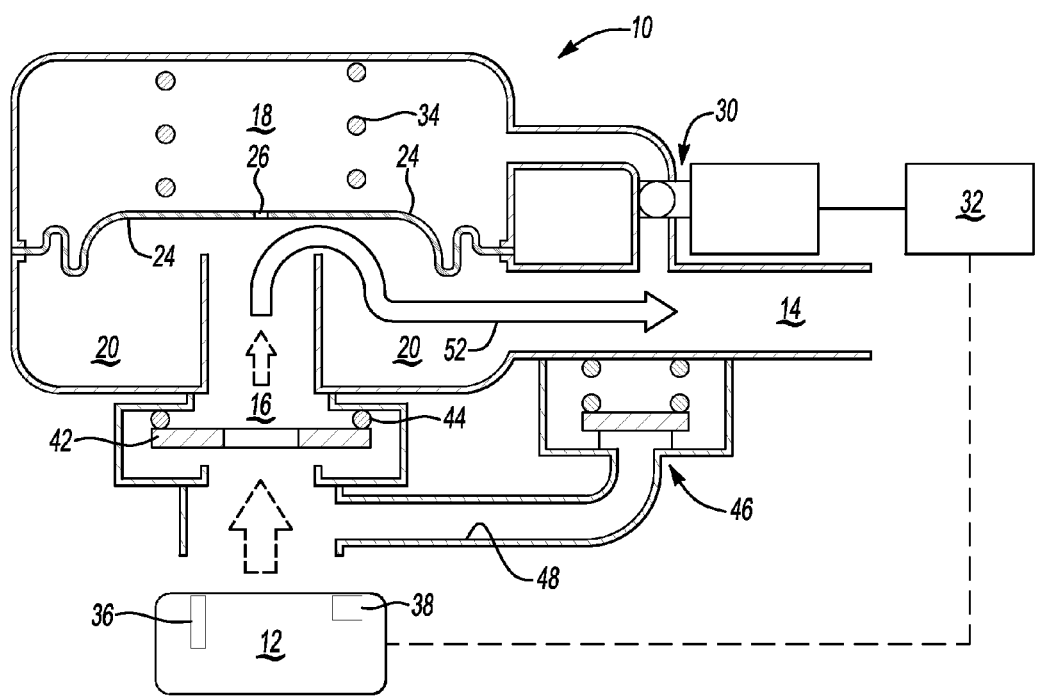
FIG. 4 is a schematic diagram of the vapor isolation valve in a restricted flow state, in which vapors are venting to an exit passage and pressures are limited by a restrictor plate.

Referring now to FIG. 4, and with continued reference to FIGS. 1-3, there is shown a situation in which the performance of valve 10 during the fuel-fill event varies from the performance during normal or run-loss conditions. As shown in FIG. 1-4, the valve 10 may include a restrictor plate 42, which is disposed between the first chamber 16 and the fuel tank 12.

The restrictor plate 42 limits the flow rate of vapors between the fuel tank 12 and the first chamber 16, and therefore causes a pressure differential between the fuel tank 12 and the first chamber 16. The pressure differential is illustrated schematically in FIG. 4 as large and small arrows (shown in phantom), below and above the restrictor plate 42, respectively. Usage of the restrictor plate 42 is dependant on the pressure difference across the additional valves (FLVV or GVV) during venting of the fuel tank 12, just prior to fuel-fill event. If the pressure difference is high, the probability of valve corking is also high, and usage of the restrictor plate 42 would be recommended.

In the phenomenon known as "corking," the force of the rushing fuel vapors may physically lift the float of the FLVV up against the seat, thereby blocking free vapor exit to the PVIV valve 10. Therefore, restricting flow into the PVIV valve 10 reduces the likelihood of corking by maintaining a higher pressure within the fuel tank 12 for a longer period of time. Higher pressure in the fuel tank 12 reduces the pressure differentials across the FLVV and, therefore, reduces the probability of the FLVV valves corking shut.

Restrictor plate 42 usage is dependant on system architecture—such as fuel tank 12 pressure relief points and valve (FLVV) orifice diameter. A restrictor spring 44 may also be included, and is configured to bias the restrictor plate 42 toward the fuel tank 12.

After a fuel-fill event, it is possible that the fuel tank 12 has been sealed (and the fuel tank cap replaced) but the pilot valve 30 has not been signaled to close, perhaps while the driver is paying for the fuel and the car remains parked next to the pump. In this case, any vapor generated in the fuel tank 12 would flow through the diaphragm orifice 26 in the diaphragm 24 and then through the pilot valve 30. This would only be the case if the vapor generation rate was very low and the flow through the diaphragm 24 was sufficient to keep the pressures equalized above and below the diaphragm 24. After refueling has been completed and the engine is re-started, the pilot valve 30 would close and pressures would be equalized and no vapor transfer will occur, as shown in FIG. 1.

Pressure differentials or changes in the relative pressures of the fuel tank 12 and exit passage 14 may occur while the vehicle is parked or otherwise not operating. Pressure equalization of P1 and P2 occurs via the diaphragm orifice 26 in the diaphragm 24. If there is any vapor generation in the fuel tank 12, P1 and P2 will be larger than P3. As the pilot valve 30 is closed and the pressure of P1 and P2 are equal on either side of the diaphragm, vapor will be contained within the fuel tank 12.

There may be situations in which P3 is larger than both P1 and P2. This event could occur either during vehicle operation or parking conditions. This could represent a condition where the vehicle is parked overnight in a hot environment, and it is possible that a vacuum could be formed in the fuel tank 12 during overnight cooling of the fuel tank 12. With the pilot valve 30 closed, unless the pressure P3 becomes large enough to override the effect of the spring force, pressure equalization of the fuel tank 12 will not occur.

If P3 becomes great enough to override the combined force from P2 in the second chamber 18 and the spring force (which is the combined effect of diaphragm spring 34 and the force required to flex the diaphragm 24) keeping the diaphragm 24 in the diaphragm closed position, the diaphragm 24 will be forced into the diaphragm open position. The diaphragm 24 is forced open by the pressure force of P3 (upward, as viewed in the Figures) acting over the third surface area.

Even after the diaphragm 24 is forced open, venting of the fuel tank 12 will not occur due to P3 being greater than P1 (and also P2). Therefore, even if the diaphragm 24 is open, the difference in pressures (P3 versus P1 and P2) will not permit outward flow or venting of the fuel tank 12. However, with the diaphragm 24 in the diaphragm open position, vapor will flow backwards (relative to normal venting) from the third chamber 20 into the first chamber 16 and then the fuel tank 12.

This reverse-flow condition is not separately shown in the Figures, but would look similar to FIG. 3 with the arrow 52 reversed to show backwards flow from the exit passage 14 into the fuel tank 12. As flow into the fuel tank 12 occurs, the relative pressure differential between the third chamber 20 and the first chamber 16 will decrease and the spring forces will eventually reseal the diaphragm 24 as forces acting on the diaphragm 24 equalize.

While refueling is the most common scenario for venting a normally-sealed fuel tank 12, on some occasions the fuel tank 12 may need to be vented for other reasons. While the vehicle is parked, there may be situations in which heating of the fuel tank 12 occurs following engine shut-off, and it is therefore possible that vapor pressure inside of the fuel tank 12 could increase to the point where a pressure relief would be required.

If the vehicle is parked and not running in a hot environment, pressure in the fuel tank 12 may reach levels that could compromise the integrity of the fuel system. To prevent this from happening, there are several possible configurations.

In one scenario, the pressure transducer 38 may be used. This pressure transducer 38 could be integrated into the PVIV valve 10 or anywhere else in the fuel system that is exposed to the fuel tank 12 and capable of monitoring the vapor pressure therein. When the pressure transducer 38 detects that the pressure of fuel tank 12 has reached a pre-determined threshold level, the control system 32 can activate the pilot valve 30, switching it to the pilot open position. Opening the pilot valve 30 allows pressure P2 (above the diaphragm 24) to bleed off and venting to occur in the same manner during the refueling—first at the low flow rate shown in FIG. 2 and then the high flow rate shown in FIG. 3, if necessary.

Figure 5:
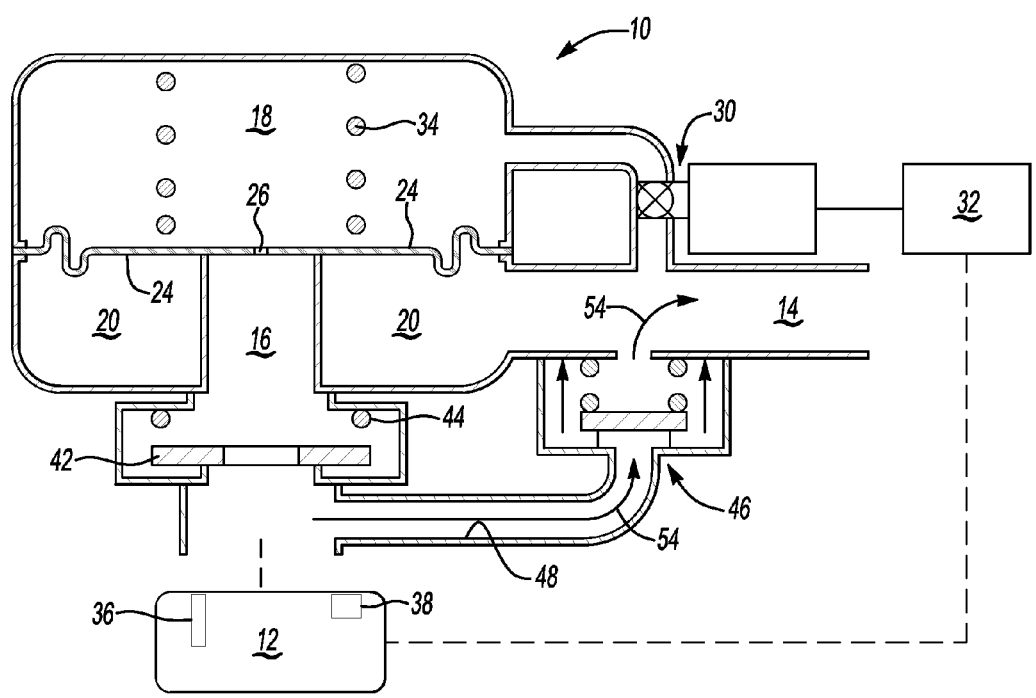
FIG. 5 is a schematic diagram of the vapor isolation valve in a pressure-relief state, in which vapors are venting to an exit passage via a pressure relief valve and there is substantially no flow through the valve chambers.

Because this pressure build-up can occur while the vehicle is not in operation, the control system 32 may not be operational to relieve the pressure build-up. It may therefore be desirable to perform overpressure relief without using the vehicle power or controls. Referring now to FIG. 5, and with continued reference to FIGS. 1-4, the valve 10 is shown accomplishing pressure relief through the use of mechanical structure not requiring actuation from the control system 32. This is shown schematically in FIG. 5 as pressure relief flow 54.

As shown in FIG. 5, the valve 10 may further include a pressure relief valve 46. A bypass channel 48 places the pressure relief valve 46 in fluid communication with the fuel tank 12 and the exit passage 14. The pressure relief valve 46 is configured to selectively allow vapor flow from the fuel tank 12 to the exit passage 14 when the pressure differential between the fuel tank 12 and the exit passage 14 reaches a predetermined threshold. Because the pressure relief valve 46 operates solely on pressure differentials, this pressure relief flow 54 may occur when the pilot valve 30 is in either of the pilot open and pilot closed positions.

Those having ordinary skill in the art will recognize structures which may be used to provide the pressure relief mechanism of the pressure relief valve 46. For example, and without limitation: a dead weight head valve (ball or disc over an orifice) would suffice or a spring-loaded valve may be utilized. When the pressure in the fuel tank 12 reaches the threshold limit the pressure relief valve 46 will naturally open and vapor may be released until the pressure returns to a more-preferable level. The pressure relief valve 46 may be packaged within the PVIV valve 10, as part of the pilot valve 30, or elsewhere in the system.

Operation of the pressure relief valve 46 and the ability of the valve 10 to force open the diaphragm 24 during high vacuum conditions within the fuel tank 12 act in combination to provide relief during excessive pressure excursions. During extreme conditions—such as high positive or negative fuel tank 12 pressure excursions—the PVIV valve contains structure capable of relieving the fuel tank 12 without interaction from the control system 12.

The PVIV valve 10 may be installed on vehicles equipped for on-board diagnostics (OBD). For OBD to occur, a vacuum is pulled from the engine intake manifold, which is in fluid communication with the exit passage 14, and the vehicle controls test for leaks in the fuel system. The fuel tank 12 is generally included in the components of the fuel system which need to be leak-checked during the OBD process.

Unlike many of the prior conditions, in this situation the exit passage 14 is purposefully lowered below atmospheric pressure. In order to place the fuel tank 12 in communication with the vacuum generated in the exit passage 14, the control system 32 places the pilot valve 30 in the pilot open position. Because flow through the valve 10 is generated based upon pressure differentials between the first, second, and third chambers 16, 18, and 20, operation of the valve 10 remains substantially the same even though the exit passage 14 is well below atmospheric pressure in this situation.

Once the vacuum is applied and the pilot valve 30 opened, P2 will become equal to P3 due to low flow through the pilot valve 30 (as shown in FIG. 2), and P2 and P3 will be less than P1. Because P2 acts on the second surface area, which is a larger area than the third surface area over which P3 acts, the diaphragm 24 will open and communication between the exit passage 14 the fuel tank 12 will exist, allowing the OBD leak check to occur.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A two-stage fuel tank vapor isolation valve, comprising:
a first chamber;
a second chamber opposite the first chamber, the second chamber comprising a bias spring and a first end of a pilot valve;
a third chamber surrounding the first chamber and opposite the second chamber, the third chamber connected to a second end of the pilot valve;
a valve movable between a first stage preventing fluid flow directly between the first chamber and the third chamber and a second stage permitting fluid flow directly between the first chamber and the third chamber, wherein the valve comprises:
a first surface comprising a first effective area, and the first surface is divided between the first chamber and the third chamber such that the third chamber is exposed to more of the first effective area than the first chamber;
a second surface comprising a second effective area equal to the first effective area, the second surface area is exposed to only the second chamber, the bias spring is biased against the second surface of the valve and against a chamber surface in the second chamber, the bias spring biasing the valve towards the first stage; and
an orifice permitting constant vapor flow between the first chamber and the second chamber;
the pilot valve movable between a pilot open position, permitting vapor flow between the second chamber and the third chamber, and a pilot closed position, preventing vapor flow between the second chamber and the third chamber, in response to a control signal; and
a control system connection for receiving electronic signals from a vehicle control device to selectively move the pilot valve between the pilot open position and the pilot closed position, wherein, in response to a fuel-fill event indication by the vehicle control device, the pilot valve is opened to permit vapor flow at a first rate from the second chamber to the third chamber while the valve is at the first stage, and then to permit vapor flow at a second rate from the first chamber directly to the third chamber when the valve moves to the second stage, and wherein, in response to a fuel level signal from the vehicle control device, the pilot valve is closed to permit vapor pressure to build and move the valve from the second stage back to the first stage,
wherein the bias spring comprises a spring force such that, when the pilot valve is closed, when a vacuum is applied to the first chamber, and when atmospheric pressure is applied to the third chamber, the valve moves from the first stage to the second stage to relieve the vacuum.

2. The valve of claim 1, further comprising a flow restrictor restricting vapor flow to the first chamber, the flow restrictor comprising a restrictor plate and a restrictor spring biasing the restrictor plate away from the first chamber, wherein the restrictor plate is movable towards the first chamber when vapor having a vapor pressure above a predetermined value acts on the restrictor plate.

3. The valve of claim 1, further comprising a pressure relief valve between the first chamber and the third chamber, wherein the pressure relief valve is one of a dead weight head valve and a spring-loaded valve, and wherein the pressure relief valve is biased to prevent vapor flow from the first chamber to the third chamber until a vapor pressure in the first chamber exceeds a bias force of the pressure relief valve.

4. The valve of claim 1, wherein, when the pilot valve is in the pilot closed position, the first chamber and the second chamber share a common vapor pressure, while the third chamber is isolated from the first chamber and from the second chamber.

5. The valve of claim 4, wherein, when the pilot valve is in the pilot open position, vapor pressure from the second chamber travels to the third chamber, and, when the first chamber experiences a pressure greater than the third chamber, the valve moves from the first stage to the second stage.

6. The valve of claim 4, wherein, when the pilot valve is in the pilot open position, and when the third chamber experiences a vacuum, the valve moves from the first stage to the second stage to permit vapor flow from the first chamber directly to the third chamber.

7. A fuel tank vapor control system, comprising:
a fuel tank;
a two-stage fuel tank vapor isolation valve, comprising:
a first chamber connected to the fuel tank;
a second chamber opposite the first chamber, the second chamber comprising a bias spring and a first end of a pilot valve;
a third chamber surrounding the first chamber and opposite the second chamber, the third chamber connected to a second end of the pilot valve;
a valve movable between a first stage preventing fluid flow directly between the first chamber and the third chamber and a second stage permitting fluid flow directly between the first chamber and the third chamber, wherein the valve comprises:
a first surface comprising a first effective area, and the first surface is divided between the first chamber and the third chamber such that the third chamber is exposed to more of the first effective area than the first chamber;
a second surface comprising a second effective area equal to the first effective area, the second surface area is exposed to only the second chamber, the bias spring is biased against the second surface of the valve and against a chamber surface in the second chamber, the bias spring biasing the valve towards the first stage; and
an orifice permitting constant vapor flow between the first chamber and the second chamber; and
the pilot valve movable between a pilot open position, permitting vapor flow between the second chamber and the third chamber, and a pilot closed position, preventing vapor flow between the second chamber and the third chamber, in response to control signals; and
a control system, comprising:
at least one of an in-tank fuel sender and a vapor pressure transducer in the fuel tank transmitting fuel-fill level signals in response to a fuel level in the fuel tank;
determination means for processing the fuel-fill level signals and for determining fuel level during a fuel-fill event; and
electronic signaling for emitting control signals for controlling the pilot valve,
wherein the control system emits electronic control signals to move the pilot valve to the pilot open position prior to the fuel-fill event to permit vapor flow from the second chamber to the third chamber at a first flow rate, and, when a first vapor pressure in the first chamber is greater than a second vapor pressure in the second chamber, the valve moves from the first stage to the second stage to permit vapor flow from the first chamber directly to the third chamber at a second flow rate greater than the first flow rate, and
wherein, when the determination means determines the fuel level is at a predetermined level, the control system emits electronic control signals to move the pilot valve to the pilot closed position, permitting vapor pressure increase in the first chamber and in the second chamber, returning the valve to the first stage, and triggering completion of the fuel-fill event via the first vapor pressure in the first chamber.

8. The fuel tank vapor control system of claim 7, wherein the control signals trigger completion of the fuel-fill event to accomplish a zero round-up fuel-fill event.

9. The fuel tank vapor control system of claim 7, wherein the two-stage fuel tank vapor isolation valve further comprises a flow restrictor restricting vapor flow to the first chamber, the flow restrictor comprising a restrictor plate and a restrictor spring biasing the restrictor plate away from the first chamber, wherein the restrictor plate is movable towards the first chamber when vapor having a vapor pressure above a predetermined value acts on the restrictor plate.

10. The fuel tank vapor control system of claim 7, wherein the two-stage fuel tank vapor isolation valve further comprises a pressure relief valve between the first chamber and the third chamber, wherein the pressure relief valve is one of a dead weight head valve and a spring-loaded valve, and wherein the pressure relief valve is biased to prevent vapor flow from the first chamber to the third chamber until a vapor pressure in the first chamber exceeds a bias force of the pressure relief valve.

11. The fuel tank vapor control system of claim 7, wherein, when the pilot valve is in the pilot closed position, the first chamber and the second chamber share a common vapor pressure, while the third chamber is isolated from the first chamber and from the second chamber.

12. The fuel tank vapor control system of claim 7, wherein, when the pilot valve is in the pilot open position, and when the third chamber experiences a vacuum, the valve moves from the first stage to the second stage to permit vapor flow from the first chamber directly to the third chamber.

13. The fuel tank vapor control system of claim 7, wherein the control system comprises the vapor pressure transducer, and wherein the vapor pressure transducer transmits a pressure signal to the control system, and the electronic signaling emits a control signal to open the pilot valve to permit vapor flow at the first flow rate and at the second flow rate.

14. A two-stage fuel tank vapor isolation valve, comprising:
a first chamber;
a second chamber opposite the first chamber, the second chamber comprising a first end of a pilot valve;
a third chamber surrounding the first chamber and opposite the second chamber, the third chamber connected to a second end of the pilot valve;
a valve movable between a first stage preventing fluid flow directly between the first chamber and the third chamber and a second stage permitting fluid flow directly between the first chamber and the third chamber, wherein the valve comprises:
a first surface comprising a first effective area, and the first surface is divided between the first chamber and the third chamber such that the third chamber is exposed to more of the first effective area than the first chamber;
a second surface comprising a second effective area equal to the first effective area, the second surface area is exposed to only the second chamber; and
an orifice permitting constant vapor flow between the first chamber and the second chamber;
the pilot valve movable between a pilot open position, permitting vapor flow between the second chamber and the third chamber, and a pilot closed position, preventing vapor flow between the second chamber and the third chamber, in response to a control signal; and
a control system connection for receiving electronic signals from a vehicle control device to selectively move the pilot valve between the pilot open position and the pilot closed position, wherein, in response to a fuel-fill event indication by the vehicle control device, the pilot valve is opened to permit vapor flow at a first rate from the second chamber to the third chamber while the valve is at the first stage, and then to permit vapor flow at a second rate from the first chamber directly to the third chamber when the valve moves to the second stage, and wherein, in response to a fuel level signal from the vehicle control device, the pilot valve is closed to permit vapor pressure to build and move the valve from the second stage back to the first stage,
when the pilot valve is closed, when a vacuum is applied to the first chamber, and when atmospheric pressure is applied to the third chamber, the valve moves from the first stage to the second stage to relieve the vacuum.

15. The valve of claim 14, further comprising a flow restrictor restricting vapor flow to the first chamber, the flow restrictor comprising a restrictor plate and a restrictor spring biasing the restrictor plate away from the first chamber, wherein the restrictor plate is movable towards the first chamber when vapor having a vapor pressure above a predetermined value acts on the restrictor plate.

16. The valve of claim 14, further comprising a pressure relief valve between the first chamber and the third chamber, wherein the pressure relief valve is one of a dead weight head valve and a spring-loaded valve, and wherein the pressure relief valve is biased to prevent vapor flow from the first chamber to the third chamber until a vapor pressure in the first chamber exceeds a bias force of the pressure relief valve.

17. The valve of claim 14, wherein, when the pilot valve is in the pilot closed position, the first chamber and the second chamber share a common vapor pressure, while the third chamber is isolated from the first chamber and from the second chamber.

18. The valve of claim 17, wherein, when the pilot valve is in the pilot open position, vapor pressure from the second chamber travels to the third chamber, and, when the first chamber experiences a pressure greater than the third chamber, the valve moves from the first stage to the second stage.

19. The valve of claim 17, wherein, when the pilot valve is in the pilot open position, and when the third chamber experiences a vacuum, the valve moves from the first stage to the second stage to permit vapor flow from the first chamber directly to the third chamber.

* * * * *